United States Patent
Arnott et al.

(10) Patent No.: US 9,329,917 B2
(45) Date of Patent: May 3, 2016

(54) VEHICLE SUSPENSION AUGMENTATION DEVICES, SYSTEMS AND METHODS

(75) Inventors: Adam M. Arnott, Windermere, FL (US); David P. Teichman, Dade City, FL (US); Robert P. Gardner, Orlando, FL (US)

(73) Assignee: Arnott, Inc., Merritt Island, FL (US)

( * ) Notice: Subject to any disclaimer, the term of this patent is extended or adjusted under 35 U.S.C. 154(b) by 529 days.

(21) Appl. No.: 13/535,651

(22) Filed: Jun. 28, 2012

(65) Prior Publication Data

US 2016/0034286 A1    Feb. 4, 2016

(51) Int. Cl.
*G06F 11/07* (2006.01)
*B60G 17/018* (2006.01)

(52) U.S. Cl.
CPC .......... *G06F 11/0739* (2013.01); *B60G 17/018* (2013.01); *B60G 2206/911* (2013.01); *B60G 2600/07* (2013.01)

(58) Field of Classification Search
CPC ............. B60G 17/018; B60G 2600/04; B60G 2600/07; B60G 2600/124; B60G 2600/187; B60G 2206/911; G06F 11/0739
USPC ...................... 701/36, 37, 39, 48, 29.1, 29, 7; 280/276, 124.179, 5.5, 5.501
See application file for complete search history.

(56) References Cited

U.S. PATENT DOCUMENTS

| | | | |
|---|---|---|---|
| 3,074,739 A | 1/1963 | Alfieri | |
| 4,078,224 A | 3/1978 | Mize | |
| 4,335,901 A | 6/1982 | Gladish | |
| 4,458,535 A | 7/1984 | Juergens | |
| 4,805,923 A | 2/1989 | Soltis | |
| 5,165,838 A | 11/1992 | Kallansrude | |
| 5,369,584 A * | 11/1994 | Kajiwara | ......... 701/48 |
| 5,476,277 A | 12/1995 | Schueman | |
| 6,203,026 B1 | 3/2001 | Jones | |
| 6,721,644 B2 | 4/2004 | Levine | |
| 6,853,896 B2 | 2/2005 | Akiyama | |
| 6,915,778 B2 | 7/2005 | Clemence | |
| 7,421,334 B2 | 9/2008 | Dahlgren | |
| 7,444,210 B2 | 10/2008 | Breed | |
| 8,063,754 B2 | 11/2011 | Tanida | |
| 8,103,414 B2 | 1/2012 | Boss | |
| 2008/0214101 A1 * | 9/2008 | Voto | .............. 455/3.02 |

(Continued)

OTHER PUBLICATIONS

Disco II Air suspension—the definitive guide, Land Rover Zone, LandyZone.co.uk, Aug. 2008.*

(Continued)

*Primary Examiner* — Khoi Tran
*Assistant Examiner* — Abby Lin
(74) *Attorney, Agent, or Firm* — Brian S. Steinberger; Law Offices of Brian S. Steinberger, P.A.

(57) ABSTRACT

Devices, systems and methods for replacing a factory installed or similar air suspension controller in a vehicle with an augmentor, which sends correct status messages to the vehicle main computer when the air suspension is replaced with coil springs or shocks. The augmentor can includes a voltage regulator, an indicator and bus interface. At power on, the program initializes the microcontroller registers, timer registers, and control registers, then loop until an inquiry or command is received, then responds with status messages that are the same as the status messages sent by the original factory installed air suspension controller until power is removed.

14 Claims, 6 Drawing Sheets

(56) References Cited

U.S. PATENT DOCUMENTS

2010/0125383 A1   5/2010   Couette
2012/0029750 A1   2/2012   Ortmann
2012/0041635 A1*  2/2012   Johnson et al. .............. 701/31.4

OTHER PUBLICATIONS

SLS to Coil Conversion, Land Rover Forums, 2008.*
RepairPal, 1993 Lincoln Mark VIII Question: can i eliminate the air ride system from the message center.*
Malafax_dand, EAS Suspension—ECU Replacement—OOPIC Microcontroller, Rangerovers.net, 2006, p. 1(8 pages of posts).*
Malafax_dand, EAS Suspension—ECU Replacement—OOPIC Microcontroller, Rangerovers.net, 2006, p. 2(9 pages of posts).*
James R. Dummond, "Parity, Checksums and CRC Checks", PHY 406F Microprocessor Interfacing Techniques, 1997.*
OrionRobots, OOPic, http://orionrobots.co.uh/OOPic, Jun. 16, 2011, Courtesy of Internet Wayback Machine.*
Sergei Skorobogatov, Copy Protection in Modern Microcontrollers, last modified Nov. 14, 2001.*

* cited by examiner

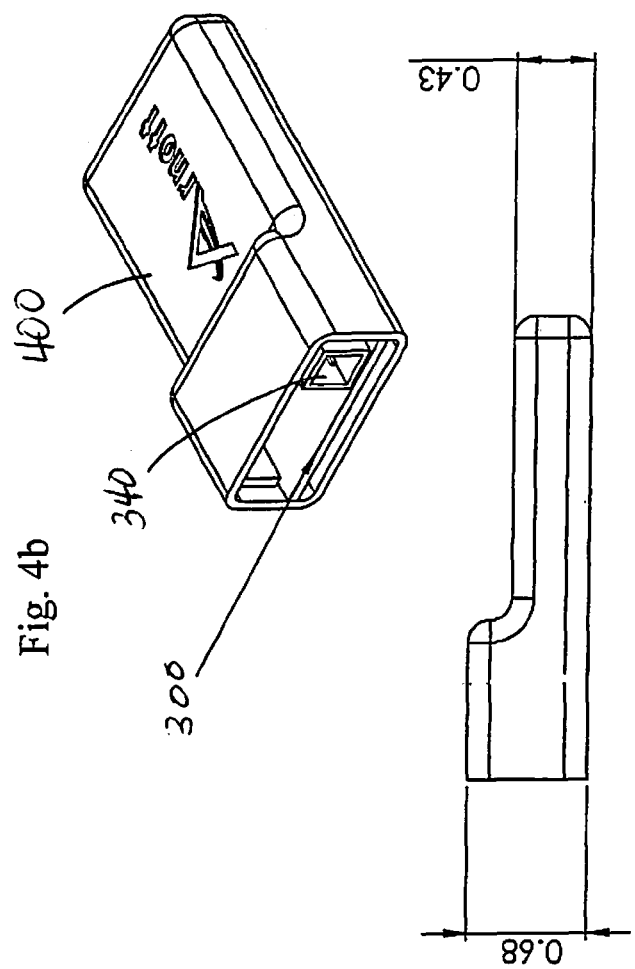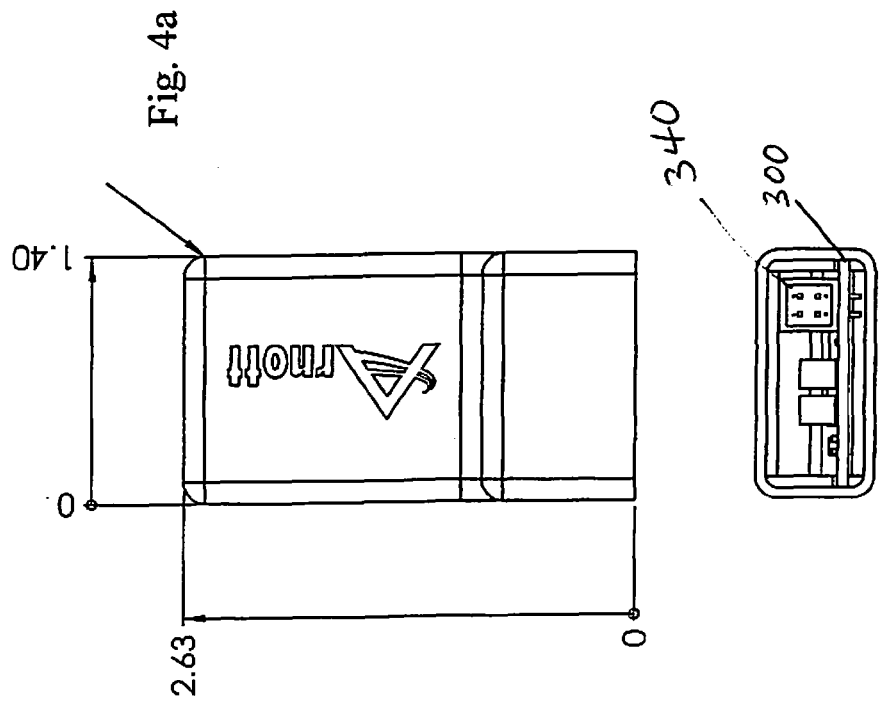

VEHICLE SUSPENSION AUGMENTATION DEVICES, SYSTEMS AND METHODS

FIELD OF THE INVENTION

This invention relates to automotive computer electronic bus communication devices and systems and, in particular, to devices, systems and methods, for replacing a computerized air suspension module with an augmentation module to communicate with a main vehicle computer when air suspension systems are replaced with different suspension systems, such as with coils or shocks, the augmentor module prevents an error message or error warning indicator light from appearing on the vehicle dashboard.

BACKGROUND AND PRIOR ART

Air suspension is a type of vehicle suspension powered by an electric or engine driven air pump or compressor. This compressor pressurizes the air, using the compressed air as a spring. Air suspension is often used in place of conventional steel springs. Many types of luxury automobiles are equipped with air suspension systems to provide a smooth, constant ride quality and in most cases a self-leveling system.

Vehicles that use air suspension today include models from Lexus®, Jeep Grand Cherokee®, General Motors vehicles, such as Cadillac®, Mercedes-Benz®, Land Rover®/Range Rover®, Audi®, Subaru®, Volkswagen®, and Lincoln®, among other types of sedans, sports cars and SUVs (sport utility vehicles).

Various types of air suspension designs can include height adjustable suspension controlled by the driver, suitable for clearing rough terrain and some systems allow the driver to choose how sporty or comfortable they want the suspension to feel. These suspension settings can also be linked to the memory seat system, which allows for the vehicle to automatically adjust the suspension to the preferences of individual drivers.

FIG. 1 is a block diagram showing the components of a conventional prior art air suspension system that has been factory installed on a vehicle. As shown, the components of an air suspension 120 for each wheel 110 includes an air spring, a solenoid valve, one at each spring, and a height sensors. The air suspension system also includes a compressor 130, a relief valve, and an air suspension controller 140. For example, the air suspension controller keeps the car at a preselected height by reading the height sensors at each wheel, and controlling the compressor, solenoid valves and relief valves to adjust the ride height for each wheel to compensate for extra cargo.

Operationally, the factory installed module reports system errors to the main vehicle computer by the bus and the main computer sends control messages to the suspension module to adjust the air suspension based on driving conditions and terrains. A status message sent by the suspension controller can contain bits representing good status or bad status for each height sensor and solenoid valve. A bad status message, such as "Check Air Suspension" can result in an advisory message to the driver being displayed as either or both a message and/or warning indicator light on the vehicle dashboard.

Status messages, such as an air bag or air strut failure can sometimes be caused by wet rot, due to old age, or moisture within the air system that damages it from the inside, or air ride suspension parts can fail because rubber dries out and punctures to the air bag which can be caused from debris on the road. With custom applications, improper installation can cause the air bags to rub against the vehicle's frame or other surrounding parts, damaging it. As time goes by, the suspension is subject to extreme wear and the sagging poor shocks and spring quality will make it difficult to properly align. This causes excessive wear to the all four tires and eventually ruins the great ride.

The factory installed air suspension repairs can be quite expensive such as up $1,500 to approximately $5,000 per air spring, which means four wheels would cost four times these amounts. The subject assignee has started to offer spring coil conversion kits that can replace the factory installed air suspension systems at a cost of up to approximately $500 to approximately $1,500 to cover all four wheels on a vehicle, which is a fraction of the costs for replacing the air suspension systems with other air suspension systems. As such, for luxury type vehicles that are in good condition and have for example, 200,000 miles or more, it would be more cost effective to use the assignees spring coils suspension kits instead of air spring suspension systems.

However, when the air suspension system are replaced with coil springs or different suspension systems, the air suspension control module reports system errors to the main vehicle computer and the bad status message results in either or both an advisory message ("Check Air Suspension System") and/or a warning indicator light to the driver on the vehicle dashboard, letting the driver and the passengers know there is a problem with the suspension system. As such the message such as "Check Air Suspension System" and/or a warning indicator light stays on indicating that a problem exists. These dashboard warning messages and/or lights will stay on causing an annoyance to the driver, since the warning messages and/or lights cannot be easily turned off. Past attempts such as but not limited to unscrewing a dashboard bulb and/or putting tape on the dashboard display are poor "band aid" treatments that fail to stop these warning messages and/or indicator lights from being activated. Additionally, a continuous dashboard warning message and/or warning indicator light can hurt the resale of the vehicles down the road since potential buyers would be turned off by having this warning messages and warning indicators lights that stay continuously on, even though the vehicle is safe to drive.

To solve the problems associated with replacement of the air spring with coil spring, an augmentation module that communicates with the main computer is needed.

SUMMARY OF THE INVENTION

A primary objective of the present invention is to provide methods, systems and devices for an augmentor module that replaces a vehicle air suspension controller when the air suspension springs are replaced with coil springs and shocks.

A secondary objective of the present invention is to provide a method, system and device for an augmentor module that receives inquires and commands from the vehicle main computer and responds with a correct status message.

A third objective of the present invention is to provide methods, systems and devices for an augmentor modules using CAN bus, GM J1850 VPW bus, Ford UBP bus, ISO 9141 bus, and LIN bus that run on a microcontroller board for use with air suspension replacement kits.

A fourth objective of the present invention is to provide methods, systems and devices for an augmentor module that allows the vehicle to remain in service without the "Check Air Suspension" or other type of warning message light on the dashboard instrument panel.

A fifth objective of the present invention is to provide methods, systems and devices that allow for replacing factory installed vehicle systems which communicate status messages with a vehicle main computer with different aftermarket products that prevents dashboard warning messages and warning indicators lights from being activated.

A sixth objective of the present invention is to provide methods, systems and devices that allow for replacing factory installed vehicle systems which communicate status messages with a vehicle main computer with different aftermarket products that continues to send automated messages to an onboard vehicle computer that the original factory installed vehicle systems are still running and are operational without any problems.

The invention includes an augmentor module which replaces an existing air suspension controller and communicates with the vehicle main computer. The augmentor module can be used when the existing air suspension components adjacent to each wheel is replaced with other types of suspension components such as coil springs and shocks. The augmentor module can receive interrogatories from a main vehicle computer and responds back with operational status messages. The augmentor module prevents at least one of: an error message from appearing on a vehicle dashboard and an error warning indicator light from being activated on the vehicle dashboard.

An embodiment of a novel augmentor module can include a connector to mate with an air suspension controller connector on a vehicle wiring harness, a microcontroller executing a set of instructions to respond to messages from a vehicle main computer with a corresponding operation status message, and a bus interface to interface the microcontroller with the vehicle main computer.

The set of instructions can include an initialization subset of instructions to initialize the microcontroller, a loop set of instructions to continuously monitor for an input message, and a status set of instructions to send the operation status message in response to receiving the input message. The initialization subset of instructions can include an instruction to clear one or more microcontroller registers.

The bus interface can include a bus interface selected from a group consisting of CAN bus, GM J1850 VPW bus, Ford UBP bus, ISO 9141 bus, and LIN bus.

The augmentor module can include a voltage regulator to regulate power supplied to the microcontroller. The augmentor module can include an indicator LED which is illuminated under computer control by the augmentor module.

The corresponding operation status message can include a good system status message sent to the vehicle main computer which prevents at least one of: an error message from appearing on a vehicle dashboard and an error warning indicator light from being activated on the vehicle dashboard.

A method for simulating a vehicle air suspension controller can include the steps of replacing an air suspension controller with an augmentor module, connecting the augmentor module to an existing air suspension controller connector on a vehicle wiring harness, and receiving messages from a vehicle main computer and sending a status message from the augmentor module in response with a corresponding operation status message.

The providing step can include the steps of providing a microcontroller executing a set of instructions to respond to the messages from a vehicle main computer with the corresponding operation status message, and providing a bus interface between the microcontroller and the vehicle main computer.

The step of providing a bus interface can include the step of selecting the bus interface from a group consisting of CAN bus, GM J1850 VPW bus, Ford UBP bus, ISO 9141 bus, and LIN bus.

The step of providing a microcontroller executing a set of instruction can include the steps of initializing the microcontroller, continuously monitoring for an input message, and sending the status message in response to receiving the input message.

The initializing can include the step of clearing one or more microcontroller registers.

The step of sending the status message can include the step of sending a good system status message to the vehicle computer which prevents at least one of: an error message from appearing on a vehicle dashboard and an error warning indicator light from being activated on the vehicle dashboard.

A modified air suspension system can include both a coil spring and shock absorber to replace an existing air suspension component, and an augmentor module to replace an air suspension controller, the augmentor module can be in communication with a vehicle main computer to receive messages from the vehicle main computer and send a status message in response, wherein the augmentor module prevents at least one of: an error message from appearing on a vehicle dashboard and an error warning indicator light from being activated on the vehicle dashboard.

The augmentor module can include a connector to mate with an air suspension controller connector on a vehicle wiring harness, a microcontroller executing a set of instructions to respond to messages from a vehicle main computer with a corresponding status message, and a bus interface to interface the microcontroller with the vehicle main computer.

The set of instructions can include an initialization subset of instructions to initialize the microcontroller, a loop set of instructions to continuously monitor for an input message, and a status set of instructions to send a status message in response to receiving the input message.

The initialization subset of instructions can include an instruction to clear one or more microcontroller registers.

The bus interface can include a bus interface selected from a group consisting of CAN bus, GM J1850 VPW bus, Ford UBP bus, ISO 9141 bus, and LIN bus.

The system can further include a voltage regulator to regulate power supplied to the microcontroller, and an LED indicator illuminated under computer control by the augmentor module.

Further objects and advantages of this invention will be apparent from the following detailed description of preferred embodiments which are illustrated schematically in the accompanying drawings.

BRIEF DESCRIPTION OF THE FIGURES

FIG. 4a is a top view of an example of an air suspension augmentor module.

FIG. 4b is a perspective view of the air suspension augmentor module of FIG. 4a.

FIG. 4c is a front view of the air suspension augmentor module of FIG. 4b.

FIG. 4d is a side view of the air suspension augmentor module of FIG. 4b.

DESCRIPTION OF THE PREFERRED EMBODIMENTS

Figure 1:
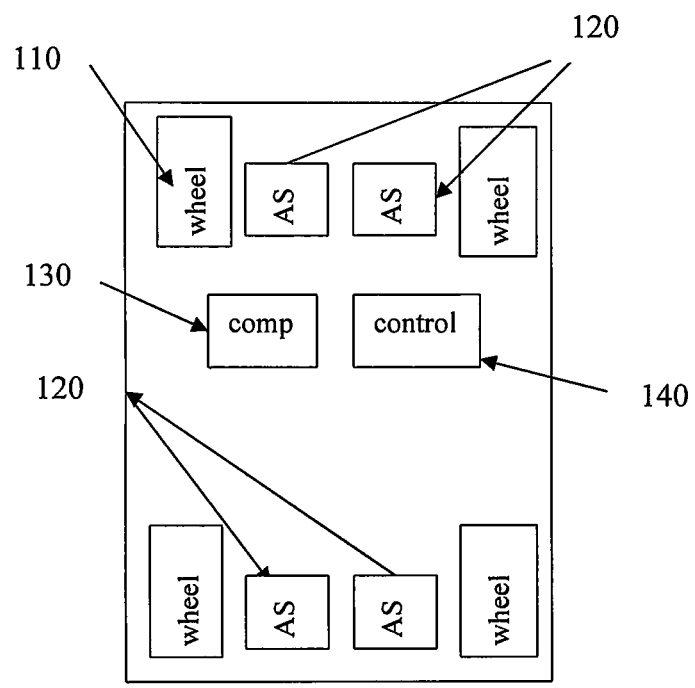
FIG. 1 is a block diagram showing the main components of a conventional prior art automobile air suspension system.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of reference numerals used in the description and the drawings to identify components:
100 air suspension system
110 wheel
120 air spring
130 compressor
140 air suspension controller
200 modified suspension system
220 coil spring and shock
240 augmentor module
300 air suspension augmentor circuit board
310 microcontroller
320 bus interface
330 voltage regulator
335 LED
340 harness connector
400 module housing The term "augmentor" is a word made up by the inventors to describe the air suspension "au mentor" module of the present invention. The Air Suspension Augmentor is an electronic supplement/substitute for the air suspension controller provided as original equipment by the auto manufacturer.

The present invention provides methods, systems and devices for an Air Suspension Augmentor module connected with the automotive communication bus used in the Air Suspension systems of various vehicles. FIG. 1 is a block diagram showing the components of a conventional automotive air suspension system. As shown, the components of an air suspension system consisting of air springs 120 for each wheel 110 includes an air spring, a solenoid valve and height sensors for each wheel. The air suspension system also includes a compressor 130, a relief valve, and an Air Suspension controller 140. The automotive buses used in air suspension systems include CAN bus, J1850 VPW, LIN bus, Ford UBP bus, and ISO 9141 bus, for example. The vehicle has a main computer module that communicates with an air suspension controller via one of these bus types.

If any air suspension system components fail, perhaps because of normal wear after several years, replacement parts can be expensive, and replacing the air suspension components with conventional coil springs and shocks can be a cost effective way to keep the vehicle in service. However, this type of replacement can involve disconnecting or switching off the air suspension controller, which is not used with the conventional coil spring and shock components. The modified air suspension system allows the vehicle to remain in service, but the "Check Air Suspension" warning message on the instrument panel is a distracting artifact of the previous system. The addition of the Air Suspension Augmentor electronic module 240 of the present invention restores the good system status message to the vehicle computer and keeps the error message from appearing by sending a correct status message to the vehicle main computer.

Figure 2:
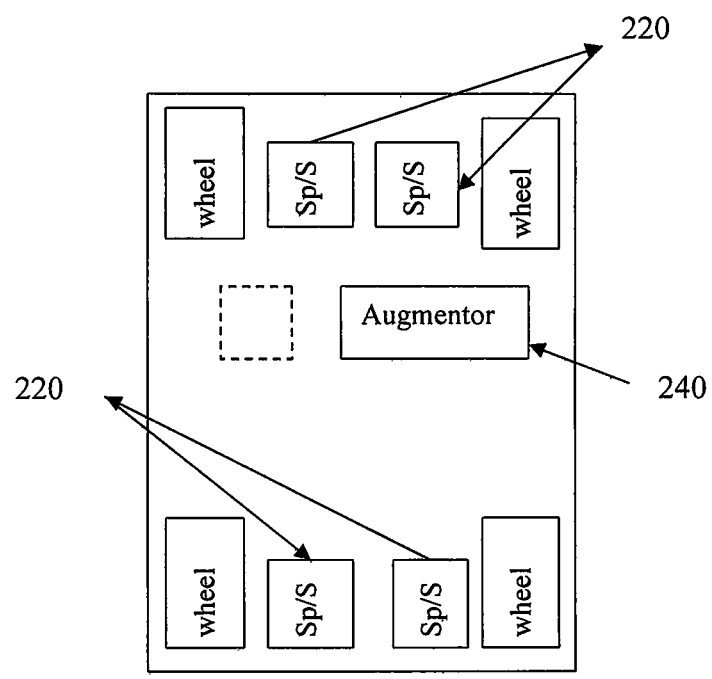
FIG. 2 is a block diagram showing the main components of an augmented automobile air suspension system according to the present invention.
Figure 3:
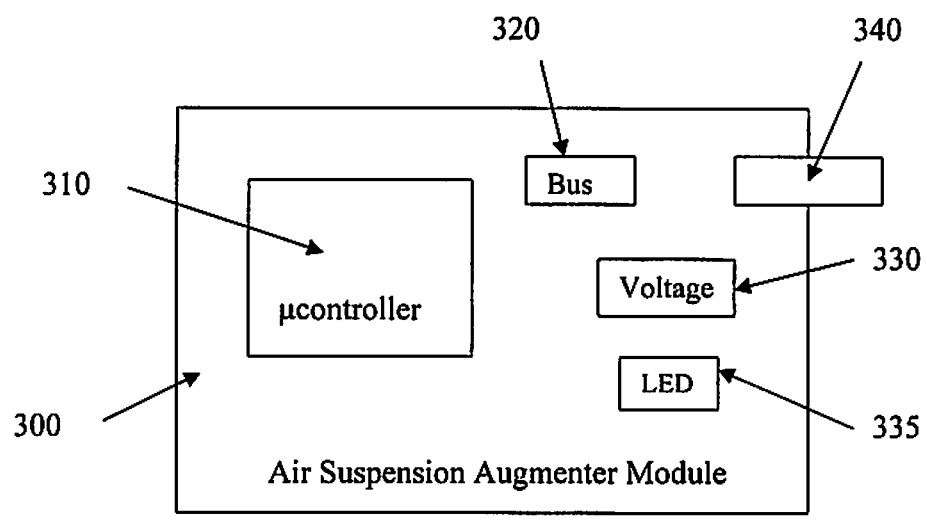
FIG. 3 is a schematic block diagram of the air suspension augmentor module of the present invention.

FIG. 2 is a block diagram showing the main components of an augmented automobile air suspension system according to the present invention. When the air suspension systems springs 120 are replaced with other suspension components, such as coil springs and shocks 20, the compressor and the air suspension controller 140 are removed and an augmentor module 240 is connected to the vehicle system bus in communication with the vehicle main computer. FIG. 3 is a schematic block diagram showing an example of an augmentor module according to an embodiment of the present invention.

The augmentor module can include an embedded microcontroller 310 connected with a bus interface integrated circuit 320 and a connector that mates with the connector on the vehicle wire harness to the main computer module. Different automobile manufacturers can have different bus structures that allow the main computer to communicate with various controllers, such as the air suspension controller 140.

The auto industry generally uses several communication busses with different electrical specifications and different packet structures/protocols. Examples of auto communication busses include CAN (Controller Area Network) on all cars from 2008 and newer, SAE J1850 VPW on GM cars before 2008, and ISO 9141 on Japanese and Chrysler cars before 2008. The present invention can provide separate air suspension augmentor modules each using one of the CAN bus, GM JI 850 VPW bus, Ford UBP bus, ISO 9141 bus, and LIN bus that run on a microcontroller board 300 that can be sold with air suspension kits. The air suspension augmentor software programs can be written in ANSI C and are contained in the microcontroller 310 on the circuit board 300.

The augmentor module supplies the proper message/packet on the bus with the same timing, protocol, and content as the factory controller for each bus type. The augmentor module can consist of a microcontroller 310 with firmware connected with a bus interface integrated circuit 320 for the type of bus used in the particular vehicle and includes a voltage regulator 330 and indicator LED 335. The augmentor module is a node on the automotive bus and can read and write packets on the bus and does not interfere with the other nodes communicating on the bus at the same time. Each augmentor module should be purposely designed for the make and model of auto that it is installed in, but the overall concept is that the augmentor module supplies the same packets on the bus with the same timing that the factory controller provides when the system is working as designed.

FIG. 4b is a perspective view of an example of an air suspension augmentor module for a Cadillac 2007 for purpose of example. FIG. 4a is a top view, FIG. 4c is a front view and FIG. 4d is a side view of the air suspension augmentor module of FIG. 4b. The circuit board 300 shown in FIG. 3 is enclosed inside the housing 400 with the connector 340 exposed for connection with the vehicle wiring harness for communication with the vehicle main computer.

When the air suspension system is replaced with coil springs or shocks the air suspension controller is disconnected or removed, thus breaking its' communication link with the main computer. This results in a failure from the perspective of the main computer. When the main computer sends an inquiry and does not receive a response, the air suspension system is reported as disabled and an advisory message is displayed to the driver on the dashboard.

To solve the problem resulting from replacement of the air suspension system with conventional coil springs and shocks, the air suspension controller is removed or disconnected and an augmentor module is installed. When the augmentor module receives an inquiry from the vehicle main computer, the augmentor module can send a response indicating to the main computer that the air suspension system is operating properly.

As the vehicle is driven, the main computer module can send instructions to the air suspension module and the instructions are intercepted by the augmentor module and a response is sent to the main computer reporting that the air suspension system is operating properly. In other words, the augmentor response results in the vehicles main computer recording proper operation of the now replaced air suspension system. Since the air suspension system is reported as operating properly after receiving instructions from the main computer module, the advisory message is not displayed.

As previously described, different vehicle manufacturers use different communication bus structures, send different inquiry and command signals and expect different responses from the air suspension module. To solve the problem, a different augmentor module can be configured for each different bus structure and each embedded microcontroller is programmed to respond with a status response expected by the corresponding vehicle main computer.

One skilled in the art should realize that the particularities in the augmentor module should not be construed as limitations of the preferred embodiment. Various air suspension system configurations and corresponding components and communication signals can be chosen and optimized for a particular application to specific vehicle makes and models without deviating from the scope of the present invention to achieve a desired performance of the vehicle air suspension augmented system.

The air suspension sensors and solenoid valves can be removed or left on the vehicle with the leads from the components secured in place with, for example, wire ties. FIG. 4c is a perspective view showing an example of an augmentor module 400. As shown, the circuit board 300 is enclosed within the housing with only the connector 340 to the main computer bus exposed for connection. Although the augmentor module is a different size than the original air suspension controller, the augmentor module can be mounted in approximately the same location within the vehicle to avoid requiring a modification to the existing vehicle wiring harness.

Referring to FIGS. 4a-4d, the novel augmentor can be smaller than the controller that is being replaced and can have a length of approximately 2.63 inches a width of approximately 1.40 inches and a thickness at one end of approximately 0.43 inches and a thickness at an opposite end of approximately 0.68 inches.

Figure 5:
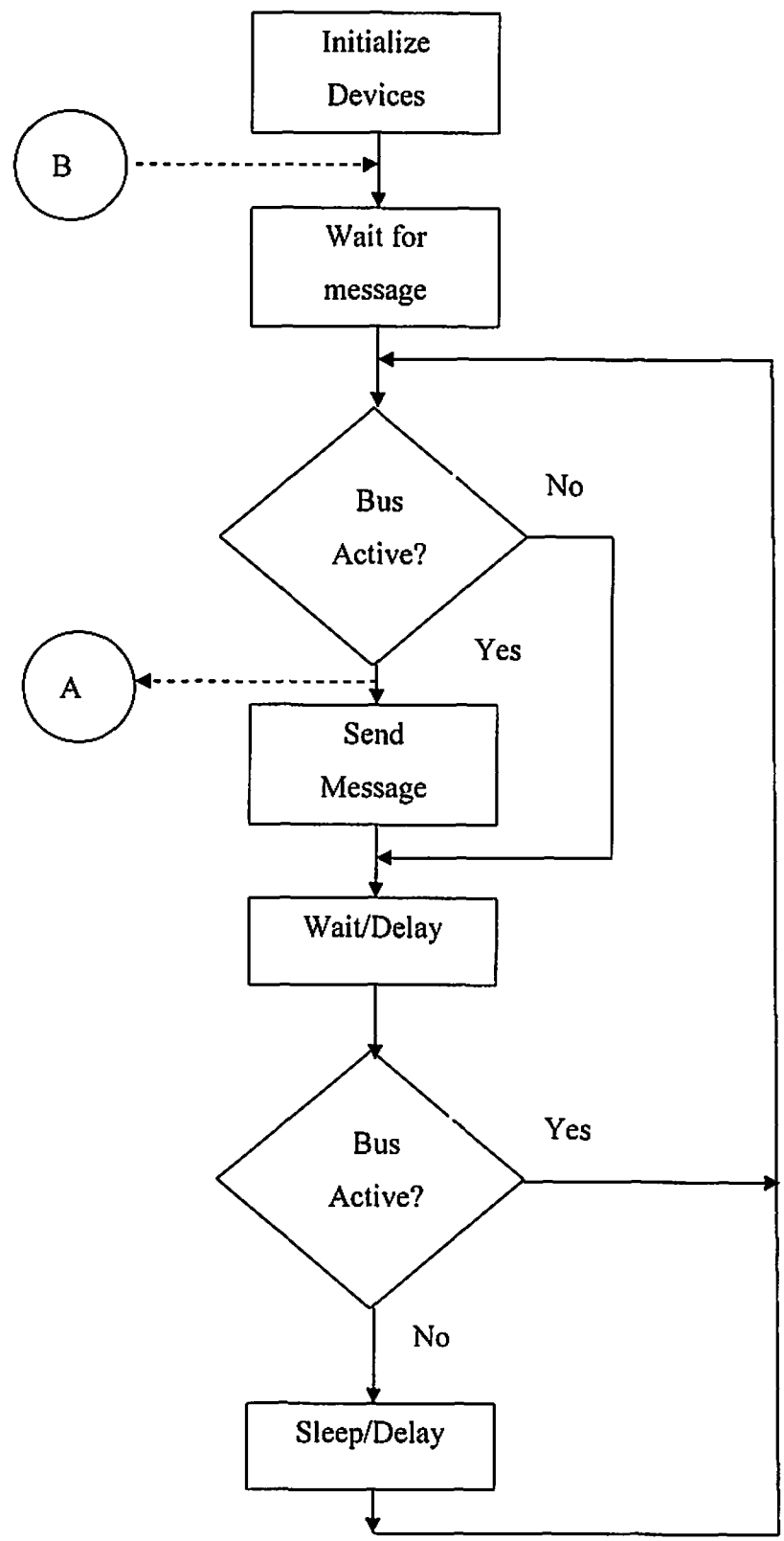
FIG. 5 is an operational flow diagram showing the operation of the air suspension augmentor module.

FIG. 5 is a general operational flow diagram showing the operation of a novel augmentor module. As different vehicles have different bus structures, so do they have different messages, commands and send different responses. As shown in FIG. 5, at power on, the augmentor software program initializes the microcontroller, registers, and other onboard devices then checks for messages in the bus. If a message is received, the augmentor module responds is a response corresponding to the message received. The augmentor responds with the same message that the factory installed air suspension controller would respond with, thus simulating the original equipment. The primary difference is that although the response to the vehicle main computer is the same as the original equipment response, the augmentor module does not connect with or control an air suspension system. Instead the augmentor module provides responses to indicate to the vehicle main computer that the air suspension system is functioning properly.

The augmentor module software loops, checking for an active bus with a message directed to the air suspension system. Depending on the make and model of the vehicle, the software varies. In one system, the augmentor module "sleeps" until a message is received and another system can have a built in delay after which a status message is set. The firmware loops waiting for messages and responding until power is removed. During the loop, when an inquiry or command is received from the main computer, the augmentor microcontroller responds with a corresponding message.

Figure 6:
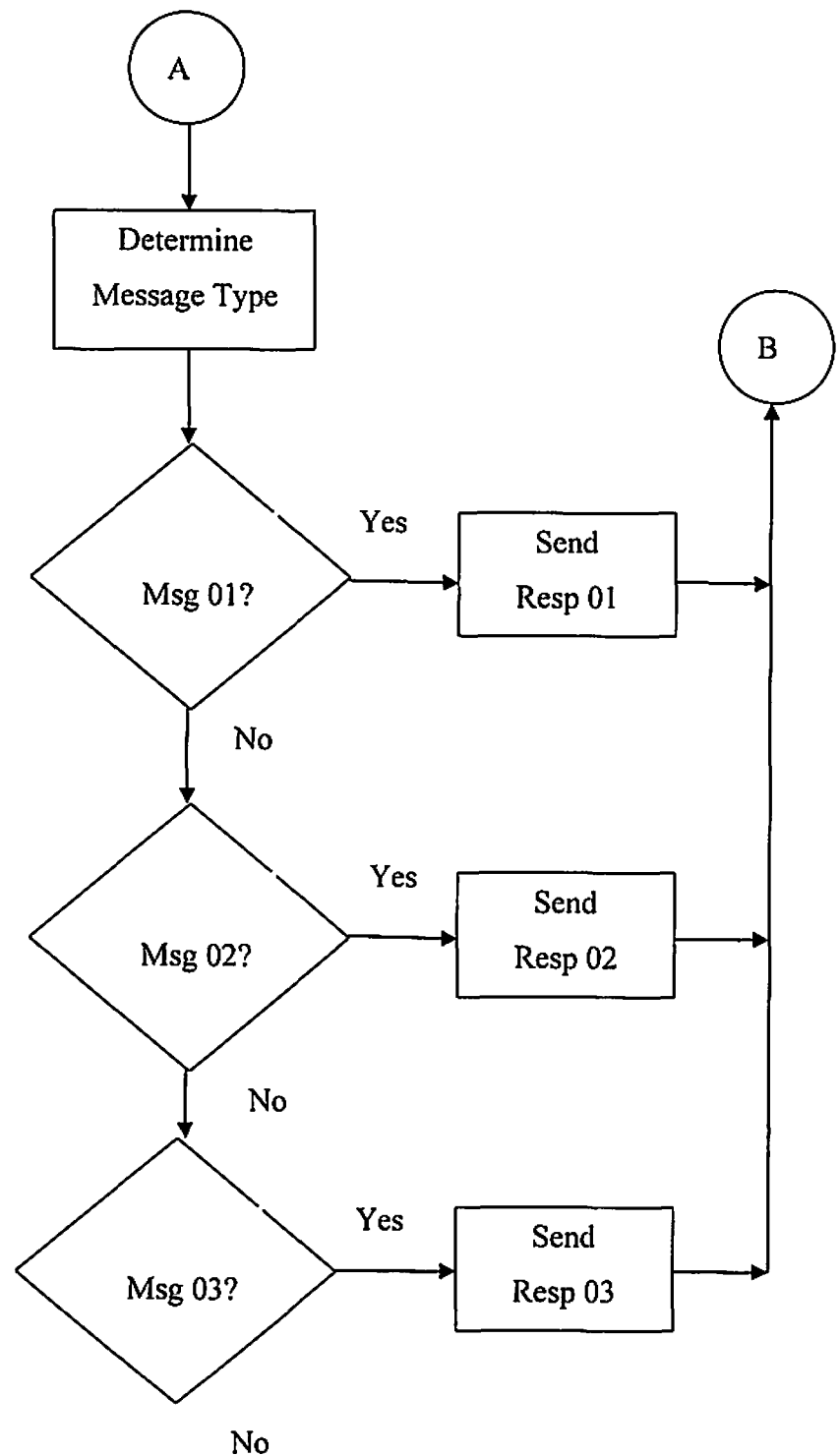
FIG. 6 is an operational flow diagram showing an example of responding to a message as a continuation of the flow diagram shown in FIG. 5.

For each different augmentor module, the status messages are the same as the status messages sent by the factory Air Suspension Controller to the vehicle computer. While one vehicle air suspension system may simply loop until a message is received and send a response, the augmentor module for a more complex system can have firmware to determine what type of message was received and then send a response corresponding to the message received as shown in FIG. 6 in conjunction with FIG. 5.

In yet another system, the microcontroller can check for the number of bytes received from the bus, check for parity error before responding to the message. As another example, the complex system can turn the augmentor module receive message "off" until after a response is sent, the receive message is turned back "on". Simply put, the operation of the augmentor module of the present invention simulates the operation of the original equipment when responding to messages received.

The invention can be marketed as an augmentor module for air suspension systems that are being replaced with coils or shocks, or a kit that includes the augmentor module and a coil air suspension system for a vehicle wheel, or a kit that includes the augmentor module with a shock for a vehicle wheel, or other combinations, and the like.

The modified air suspension system in combination with the augmentor module allows the vehicle to remain in service, without the "Check Air Suspension" warning message on the instrument panel that is a distracting artifact of the previous system with the air suspension controller operating. The addition, the augmentor module of the present invention restores the good system status message to the vehicle computer and keeps the error message from appearing, and instead the vehicle main computer records that the original air suspension system is either running or has been replaced with another similar operational air suspension system.

The invention can include methods, systems and devices that allow for replacing any other type of factory installed vehicle systems which communicate status messages with a vehicle main computer with different aftermarket products where a novel module can be used that prevents dashboard warning messages and warning indicators lights from being activated or that the original systems have been replaced with like type systems. The invention can include methods, systems and devices that allow for replacing factory installed vehicle systems which communicate status messages with a vehicle main computer with other types different aftermarket products that use module to continuously send automated messages to an onboard vehicle computer that the original factory installed vehicle systems are still running and are operational without any problems or that the original factory installed systems have been replaced with like type systems.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A non-programmable augmentor module for replacing a vehicle air suspension controller comprising:
   a cable as part of the augmentor module with a connector to mate with an air suspension controller connector on a vehicle wiring harness after the vehicle air suspension controller is disconnected;
   a microcontroller within the augmentor module for executing a set of firmware instructions stored in read only memory to simulate the disconnected air suspension controller by responding to messages received from a vehicle main computer, the response consisting of a simulated operation status message corresponding to the received message from the vehicle main computer, said instructions including an initial subset of instructions to initialize the microcontroller including an instruction to clear one or more microcontroller registers, a loop set of instruction to continuously monitor for an input message, and a status set of instructions to send the simulated operation status message in response to receiving the input message to said vehicle main computer, said simulated message stating that the air suspension controller is operating properly so that no advisory message or indicator light is displayed or lit on a dashboard of the vehicle; and
   a bus interface integrated circuit to interface the microcontroller with the vehicle main computer, wherein the augmentor module is not programmable and does not interface with air suspension system valves and sensors adjacent to a vehicle wheel.

2. The augmentor module of claim 1 wherein the loop set of firmware instructions comprises:
   a message type set of instruction for determining a type of message received and sending a message packet corresponding to the type of message received, the message packet and timing corresponding one of CAN bus, GM J1850 VPW bus, Ford UBP bus, ISO 9141 bus, and LIN bus.

3. The augmentor module of claim 2 wherein the loop set of instructions includes an instruction for checking a parity of the input message received.

4. The augmentor module of claim 1 wherein the bus interface comprises:
   a bus interface selected from a group consisting of CAN bus, GM J1850 VPW bus, Ford UBP bus, ISO 9141 bus, and LIN bus.

5. The augmentor module of claim 1 further comprising:
   a voltage regulator to regulate power supplied to the microcontroller.

6. The augmentor module of claim 1 further comprising:
   an indicator illuminated by the augmentor module.

7. The augmentor module of claim 1, wherein the corresponding operation status message includes:
   a good system status message sent to the vehicle main computer which prevents at least one of:
   an error message from appearing on the vehicle dashboard and an error warning indicator light from being activated on the vehicle dashboard, wherein the vehicle main computer records that the air suspension system is running or has been replaced with another similar operational air suspension system.

8. A method for simulating a vehicle air suspension controller module comprising the steps of:
   providing a non-programmable air suspension augmentor module with firmware for simulating the air suspension controller module when an existing air suspension system on a vehicle is replaced with coil spring or shock components, said firmware including instructions, said instructions including an initial subset of instructions to initialize a microcontroller including an instruction to clear one or more microcontroller registers, a loop set of instruction to continuously monitor for an input message, and a status set of instruction to send a simulated operation status message in response to receiving the input message to said vehicle main computer, said simulated message stating that the air suspension controller is operating properly so that no advisory message or indicator light is displayed or lit on a dashboard of the vehicle; and;
   disconnecting the air suspension controller module from a vehicle wiring harness air suspension controller connector;
   replacing the vehicle air suspension controller module with the non-programmable air suspension augmentor module, the augmentor module including a non-programmable microcontroller and a connector to connect the augmentor module with the vehicle harness air suspension controller connector and an interface integrated circuit therebetween to interface the non-programmable microcontroller with a vehicle main computer;
   connecting the air suspension augmentor module to the vehicle wiring harness air suspension controller connector
   receiving messages at the augmentor module from the vehicle main computer via the wiring harness and sending a status message from the augmentor module in response based upon said instructions from said firmware, the status message consisting of a corresponding simulated operation status message wherein the air suspension augmentor module is not connected to existing air suspension valves and sensors and is limited to receiving messages and sending simulated status messages.

9. The method of claim 8 wherein the providing step comprises the steps of:
   providing the microcontroller executing a set of instructions to respond to the input message from the vehicle main computer with the corresponding simulated operation status message; and
   providing a bus interface between the microcontroller and the vehicle main computer.

10. The method of claim 9 wherein the step of providing a bus interface comprises the step of:
    selecting the bus interface from a group consisting of CAN bus, GM J1850 VPW bus, Ford UBP bus, ISO 9141 bus, and LIN bus.

11. The method of claim 10 wherein the receiving step includes the step of:
    checking a parity of the input message received.

12. The method of claim 11 wherein the receiving step includes the step of:
    determining a type of message received; and
    sending a message packet corresponding to the type of message received, the message packet and timing corresponding one of CAN bus, GM J1850 VPW bus, Ford UBP bus, ISO 9141 bus, and LIN bus.

13. The method of claim 8, wherein the step of sending the status message consists of the step of:
    sending a good system status message to the vehicle computer which prevents at least one of: an error message from appearing on a vehicle dashboard and an error warning indicator light from being activated on the vehicle dashboard, wherein the vehicle main computer records that a factory installed air suspension system is running or has been replaced with another similar operational air suspension system.

14. An augmentor module comprising:

an augmentor simulation module housing to replace an air suspension controller for a vehicle when a coil spring or shock absorber replaces an air suspension component, said housing including an augmentor microcontroller;

said augmentor microcontroller having read-only memory and a set of preprogrammed firmware instructions stored in the read-only memory, wherein the augmentor module communication with a vehicle main computer is limited to receiving messages from the vehicle main computer and sending a simulated operation status message in response, said instructions including an initial subset of instructions to initialize the microcontroller including an instruction to clear one or more microcontroller registers, a loop set of instruction to continuously monitor for an input message, and a status set of instructions to send the simulated operation status message in response to receiving the input message to said vehicle main computer, said simulated message stating that the air suspension controller is operating properly so that no advisory message or indicator light is displayed or lit on a dashboard of the vehicle, wherein installation of the augmentor module to replace the air suspension controller prevents at least one of: an error message from appearing on a vehicle dashboard and an error warning indicator light from being activated on the vehicle dashboard since the augmentor module's status message simulates a air suspension status message resulting in the vehicle main computer recording that a factory installed air suspension system is running or has been replaced with another similar operational air suspension system;

a connector to mate with an air suspension controller on a vehicle wiring harness; and a bus interface to interface integrated circuit between the augmentor microcontroller and the connector for the microcontroller to communicate with the vehicle main computer.

* * * * *